US008481616B2

(12) United States Patent
Sun et al.

(10) Patent No.: US 8,481,616 B2
(45) Date of Patent: Jul. 9, 2013

(54) INTERCALATION AGENT FREE COMPOSITIONS USEFUL TO MAKE NANOCOMPOSITE POLYMERS

(75) Inventors: Luyi Sun, Bryan, TX (US); Jae Woong Boo, College Station, TX (US); Hung-jue Sue, College Station, TX (US); Maurice J. Marks, Lake Jackson, TX (US); Richard F. Fibiger, Midland, MI (US); Michael S. Paquette, Midland, MI (US)

(73) Assignees: Dow Global Technologies LLC, Midland, MI (US); The Texas A & M University, College Station, TX (US)

( * ) Notice: Subject to any disclaimer, the term of this patent is extended or adjusted under 35 U.S.C. 154(b) by 0 days.

(21) Appl. No.: 13/351,004

(22) Filed: Jan. 16, 2012

(65) Prior Publication Data
US 2012/0136093 A1 May 31, 2012

Related U.S. Application Data (63) Continuation of application No. 12/515,692, filed as application No. PCT/US2007/024030 on Nov. 16, 2007, now Pat. No. 8,114,925.

(60) Provisional application No. 60/861,872, filed on Nov. 30, 2006.

(51) Int. Cl.
*C08G 59/18* (2006.01)
*C08K 9/00* (2006.01)
*C08K 7/00* (2006.01)
*C08K 3/34* (2006.01)
*B32B 27/20* (2006.01)
*B32B 27/38* (2006.01)

(52) U.S. Cl.
USPC ........... 523/443; 523/402; 523/440; 523/466; 524/492; 524/493; 977/778; 977/779; 977/783; 977/784; 977/785; 977/786; 977/787

(58) Field of Classification Search
None
See application file for complete search history.

(56) References Cited

U.S. PATENT DOCUMENTS

| 3,686,359 | A | 8/1972 | Soldatos et al. |
| 4,066,628 | A | 1/1978 | Ashida et al. |
| 4,438,254 | A | 3/1984 | Doorakian et al. |
| 4,480,082 | A | 10/1984 | McLean et al. |
| 5,089,588 | A | 2/1992 | White et al. |
| 5,115,075 | A | 5/1992 | Brennan et al. |
| 5,171,820 | A | 12/1992 | Mang et al. |
| 5,246,751 | A | 9/1993 | White et al. |
| 5,973,053 | A | 10/1999 | Usuki et al. |
| 6,458,879 | B1 | 10/2002 | Grutke et al. |
| 7,785,492 | B1 * | 8/2010 | Jang et al. ................. 252/378 R |
| 2002/0098309 | A1 | 7/2002 | Bagrodia et al. |
| 2003/0218258 | A1 | 11/2003 | Charles et al. |
| 2004/0167257 | A1 | 8/2004 | Ryang |
| 2008/0048152 | A1 * | 2/2008 | Jang et al. ................. 252/378 R |
| 2008/0139729 | A1 | 6/2008 | Wang et al. |
| 2009/0226744 | A1 | 9/2009 | Dinega |

FOREIGN PATENT DOCUMENTS

| CN | 1354198 A | 6/2002 |
| CN | 1712463 | 12/2005 |
| WO | 9311190 | 6/1993 |
| WO | WO 2005061620 A1 * | 7/2005 |
| WO | 2006006937 | 1/2006 |
| WO | 2006075971 A1 | 7/2006 |
| WO | 2007133763 A2 | 11/2007 |
| WO | 2008143643 | 11/2008 |

OTHER PUBLICATIONS

Product data sheet for Cloisite® Na+, provided by Neunano (no date).*
Wang, et al., "Hydrothermal Effects on the Thermomechanical Properties of High Performance Epoxy/Clay Nanocomposites", Polymer Engineering and Science, vol. 46, 2006, pp. 215-221, XP002466055.
Chen, et al., "Organoclay—Aerospace Epoxy Nanocomposites", 46th International SAMPE Symposium, May 6-10, 2001, pp. 362-374, XP008051803.
Chen, et al., "Synthesis of Disordered and Highly Exfoliated Epoxy/Clay Nanocomposites Using Organoclay with Catalytic Function via Acetone-Clay Slurry Method", American Chemical Society, Chem. Mater., vol. 16, No. 24, 2004, pp. 4864-4866, XP002465720.
Wang, et al., "Epoxy Nanocomposites with Highly Exfoliated Clay: Mechanical Properties and Fracture Mechanisms", American Chemical Society, Macromolecules, vol. 38, No. 3, 2005, pp. 788-800, XP002466054.
International Search Report and Written Opinion from related PCT application PCT/US2007/024030 dated Jun. 26, 2009, 4 pages.
International Preliminary Report on Patentability from related PCT application PCT/US2007/024030 dated Jul. 7, 2009, 7 pages.
Miyagawa, et al., "Intercalation and Exfoliation of Clay Nanoplatelets in Epoxy-Based Nanocomposites: TEM and XRD Observations", Polymer Engineering and Science, 2006, pp. 452-463.
H.E. Lee and K. Neville, "Handbook of Epoxy Resins", McGraw-Hill, New York, 1967, Chapters 1-4, 13, 15 and 17-24.

* cited by examiner

*Primary Examiner* — Michael J Feely
(74) *Attorney, Agent, or Firm* — Brooks, Cameron & Huebsch, PLLC (57) ABSTRACT

A two step method for preparing a filler composition, the filler composition useful to prepare a nanocomposite polymer and an epoxy nanocomposite coating. First, disperse a water dispersible filler material in a liquid comprising water, but without any added intercalation agent, to form a dispersion. Second, replace at least a portion of the water of the liquid with an organic solvent so that the water concentration of the liquid is less than six percent by weight to form the filler composition, the average size of at least one dimension of the filler material being less than two hundred nanometers upon examination by transmission electron microscopy of a representative freeze dried sample of the dispersion of the first step. A nanocomposite polymer can be prepared by mixing the filler composition with one or more polymer, polymer component, monomer or prepolymer to produce a polymer containing the filler composition.

12 Claims, 6 Drawing Sheets

INTERCALATION AGENT FREE COMPOSITIONS USEFUL TO MAKE NANOCOMPOSITE POLYMERS

CROSS-REFERENCE TO RELATED SUBJECT MATTER

This application is a Continuation application of U.S. patent application Ser. No. 12/515,692 filed May 20, 2009 (now U.S. Pat. No. 8,114,925), which is a National Stage application under 35 U.S.C. 371 of PCT/US07/24030, filed Nov. 16, 2007, which claims the benefit of U.S. Provisional Application Ser. No. 60/861,872, filed Nov. 30, 2006, the entire contents of which are incorporated herein by reference.

BACKGROUND OF THE INVENTION

The instant invention is in the field of nanocomposite polymers. More specifically, the instant invention is in the field of compositions useful to make nanocomposite polymers and methods of preparing such compositions.

Delaminated or exfoliated cation exchanging layered materials (such as delaminated 2:1 layered silicate clays) can be used as reinforcing filler in a polymer system. Such polymer systems are known as "nanocomposites" when at least one dimension of the filler is less than two hundred nanometers. Nanocomposite polymers generally have enhanced mechanical property characteristics vs. conventionally filled polymers. For example, nanocomposite polymers can provide both increased modulus, lower density, improved clarity, lower coefficient of thermal expansion and in some instances increased impact toughness, a combination of mechanical properties that is not usually obtained using conventional fillers such as talc.

Transmission electron photomicrographs of nanocomposite polymers having a cation exchanging layered material filler typically show a dispersion of multiple layer units (e.g., from one to five layers per unit) of the cation-exchanging layered material in the polymer matrix. However, it is generally desired to achieve a high degree of delamination of the cation-exchanging layered material. Ideally the degree of such delamination is so extensive that only single layer units of the cation-exchanging layered material are present. If the cation-exchanging layered material is not sufficiently delaminated, then the mechanical property improvement of the polymer composite will usually be no better than if conventional micron sized filler is dispersed in the polymer.

Cation exchanging layered materials are often treated with an organic cation (usually an "onium") as an "intercalation agent" to facilitate delamination of the cation exchanging layered material before the cation exchanging layered material is blended with a polymer (see, for example U.S. Pat. No. 5,973,053). However, the use of such intercalation agents increases the cost of the nanocomposite polymer and can act as a plasticizer for the polymer and thereby limit the strength, thermal resistance and stability of the nanocomposite polymer. It would be an advance in the nanocomposite polymer art if the use of such intercalation agents could be eliminated while never-the-less maintaining a sufficient degree of delamination of a cation exchanging layered material to produce a lower cost nanocomposite polymer having a better balance of physical property improvements.

SUMMARY OF THE INVENTION

The instant invention provides a solution to the above stated problem. The instant invention provides an intercalation agent free filler composition useful to make a nanocomposite polymer having increased flexural modulus with no reduction in toughness or glass transition temperature. In one embodiment, the instant invention is a method for preparing a filler composition useful to prepare a nanocomposite polymer, comprising the steps of: (a) dispersing a water dispersible filler material in a liquid comprising water to form a dispersion; (b) replacing at least a portion of the water of the liquid with an organic solvent so that the water concentration of the liquid is less than six percent by weight to form the filler composition, the average size of at least one dimension of the filler being less than two hundred nanometers upon examination by transmission electron microscopy of a representative freeze dried sample of the dispersion of step (a).

In another embodiment, the instant invention is a method for preparing a nanocomposite polymer by the step of: mixing the filler composition of the instant invention with one or more polymer, polymer component, monomer or prepolymer to produce a polymer containing a filler having an average size of at least one dimension of the filler of less than two hundred nanometers upon examination by transmission electron microscopy of a representative sample of the polymer.

In another embodiment, the instant invention is an epoxy resin composition useful for making an epoxy nanocomposite polymer, the epoxy resin composition made by the steps of: (a) mixing an epoxy resin with the filler composition of the instant invention to form an epoxy resin mixture; and (b) removing most of the organic solvent from the epoxy resin mixture to form the epoxy resin composition.

In yet another embodiment, the instant invention is an epoxy nanocomposite polymer made by the steps of: (a) mixing an epoxy resin curing agent with the epoxy resin composition to form an uncured epoxy nanocomposite polymer; and (b) curing the uncured epoxy nanocomposite polymer to form the epoxy nanocomposite polymer containing filler having an average size of at least one dimension of the filler of less than two hundred nanometers upon examination by transmission electron microscopy of a representative sample of the epoxy nanocomposite polymer.

In still another embodiment, the instant invention is a nanocomposite polymer, made by the steps of: mixing the filler composition of the instant invention with one or more polymer, polymer component, monomer or prepolymer to produce a polymer containing a filler having an average size of at least one dimension of the filler of less than two hundred nanometers upon examination by transmission electron microscopy of a representative sample of the polymer.

DETAILED DESCRIPTION

In one embodiment, the instant invention is a method for preparing a filler composition, the filler composition useful to prepare a nanocomposite polymer, comprising the steps of: (a) dispersing a water dispersible filler material in a liquid comprising water to form a dispersion; (b) replacing at least a portion of the water of the liquid with an organic solvent so that the water concentration of the liquid is less than six percent by weight to form the filler composition, the average size of at least one dimension of the filler material being less than two hundred nanometers upon examination by transmission electron microscopy of a representative freeze dried sample of the dispersion of step (a). The water dispersible filler material can include high aspect ratio particles (plates, sheets, fibers, and ribbons), medium aspect ratio particles and low aspect ratio particles (sand like or spheroidal in shape) of various compositions and morphologies. The gist of the instant invention is the conversion of a preferably hydrophilic inorganic colloid into a composition that can be used to prepare a nanocomposite polymer, by dispersing the water dispersible filler material in a liquid comprising water (and often just water) to form a dispersion, then replacing most of the water with an organic solvent. For example and without limitation thereto, the concentration of water dispersible filler material of a water dispersion of the water dispersible filler material can be increased by centrifugation and then a water miscible organic solvent can be added to the concentrated water dispersible filler material to form the filler composition of the instant invention. Preferably, the water concentration of the filler composition thus formed is further reduced by adding more organic solvent (which may or may not be as water miscible as the initial added organic solvent) followed by concentration of the filler material by, for example and without limitation thereto, centrifugation, to produce a filler composition having a water concentration reduced thereby. A filler composition having an even lower water concentration can be prepared by repeating the operation of the preceding sentence one or more times. A highly preferred filler material is a cation exchanging layered material wherein the cation exchanging capacity of the cation exchanging layered material is less than twenty percent exchanged with an organic cation (more preferably the cation exchanging capacity of the cation exchanging layered material is essentially free of organic cation).

The water dispersible filler material can, without limitation thereto, be selected from the group consisting of natural or synthetic bentonite, montmorillonite, hectorite, fluorohectorite, saponite, stevensite, nontronite, sauconite, glauconite, vermiculite, chlorite, mica, hydromica, muscovite, biotite, phlogopite, illite, talc, pyrophillite, sepiolite, attapulgite, palygorskite, berthierine, serpentine, kaolinite, dickite, nacrite, halloysite, allophane, hydrotalcite, pyroaurite, calcite, wollastonite, various colloidal borates, silicates, aluminates, phosphates, sulfates, sulfides and halides, as well as various synthetic sols, colloids, gels and fumes made, for example and without limitation thereto, adding acid to a sodium silicate or sodium aluminate solution (and mixtures), or adding base to metal salt solutions, or by hydrolyzing metal alkoxides.

The organic solvent initially added to the dispersion of the water dispersible filler material in water is preferably miscible with water in all proportions. Examples of suitable organic solvents include, without limitation thereto, alcohols, ketones, glycols, ethers, glycol ethers, glymes (glycol dimethyl ethers), butanediol, hexanediol, amines, polyether polyamines, N-methylformamide, N-methylpyrrolidone, dimethylformamide, diethanolamine, triethanolamine, polyglycols and mixtures thereof. Water can be removed from the mixture of the organic solvent and the dispersion of the water dispersible filler material in water by any suitable method such as, without limitation thereto, distillation, centrifugation, filtration, dialysis and evaporation.

As discussed above, it is known that delaminated or exfoliated cation exchanging layered materials (such as delaminated 2:1 layered silicate clays) can be used as reinforcing filler in a polymer system. Such polymer systems are known as "nanocomposites" when at least one dimension of the delaminated cation exchanging layered material is less than two hundred nanometers. Typically, transmission electron microscopy of a nanocomposite polymer shows a few or no single layers of delaminated cation exchanging layered material but rather mostly multiple layer stacks of cation exchanging layered material. Never-the-less, such nanocomposite polymers generally have enhanced mechanical property characteristics versus conventionally filled polymers. For example, such nanocomposite polymers can provide both increased modulus and increased impact toughness, a combination of mechanical properties that is not usually obtained using conventionally sized fillers. Although the filler of a nanocomposite polymer is usually a cation exchanging layered material it should be understood that, as discussed above, any filler can be used in the instant invention as long as the filler is water dispersible and wherein at least one dimension of the filler averages less than two hundred nanometers.

The term "cation exchanging layered material" means layered oxides, sulfides and oxyhalides, layered silicates (such as Magadiite and kenyaite) layered 2:1 silicates (such as natural and synthetic smectites, hormites, vermiculites, illites, micas, and chlorites). Cation exchanging layered materials are often treated with an organic cation (usually an "onium") to facilitate delamination of the cation exchanging layered material when it is blended with a polymer (see, for example U.S. Pat. No. 5,973,053). Conventionally, the layered material is "fully exchanged" or "overexchanged", i.e., the exchangeable cations of the layered material are essentially fully replaced by onium ions or the exchangeable cations of the layered material are essentially fully replaced by onium ions and the material contains additional onium ions. The use of such onium ions as intercalation agents increases the cost of the nanocomposite polymer and these agents can act as a plasticizer for the polymer and thereby limit the strength and thermal resistance stability of the nanocomposite polymer. Thus, it would be an advance in the nanocomposite polymer art if the use of such intercalation agents could be eliminated.

The cation exchange capacity of a cation exchanging layered material describes the ability to replace one set of cations (typically inorganic ions such as sodium, calcium or hydrogen) with another set of cations (either inorganic or organic). The cation exchange capacity can be measured by several known methods, most of which perform an actual exchange reaction and analyzing the product for the presence of each of the exchanging ions. Thus, the stoichiometry of exchange can be determined on a mole percent basis. It is observed that the various cation exchanging layered materials have different cation exchange capacities which are attributed to their individual structures and unit cell compositions.

The term "organic cation" means a cation that contains at least one hydrocarbon radical. Examples of organic cations include, without limitation thereto, phosphonium, arsonium, sulfonium, oxonium, imidazolium, benzimidazolium, imidazolinium, protonated amines, protonated amine oxides, protonated betaines, ammoniums, pyridiniums, aniliniums, pyrroliums, piperidiniums, pyrazoliums, quinoliniums, isoqunoliniums, indoliums, oxazoliums, benzoxazoliums, and quinuclidiniums. A typical example of an organic cation is a quaternary ammonium compound of formula $R_1R_2R_3R_4N^+$, wherein at least one of $R_1$, $R_2$, $R_3$ or $R_4$ contains ten or more carbon atoms. The term "organic cation" also includes a protonated amine which can be prepared, for example and without limitation thereto, by the contact of the cation exchanging layered material with an acid followed by contact of the cation exchanging layered material with an organic amine to protonate the amine.

In another embodiment, the instant invention is a method for preparing a nanocomposite polymer by the steps of mixing the filler composition of the instant invention with one or more polymer, polymer component, monomer or prepolymer to produce a polymer containing a filler having an average size of at least one dimension of the filler of less than two hundred nanometers upon examination by transmission electron microscopy of a representative sample of the polymer. For example and without limitation thereto, when the monomer comprises an epoxy resin, then the filler composition can be mixed with the epoxy resin to form a mixture with the filler composition which mixture can then be devolatilized to remove organic solvent and then cured to produce an epoxy nanocomposite polymer (the term "devolatilized" includes evaporation of the organic solvent). As an additional example and without limitation thereto, the filler composition can be blended with a molten thermoplastic polymer in an extruder having a subsequent section for removing most of the organic solvent of the filler composition.

In a related embodiment, the instant invention is an epoxy resin composition useful for making a cured epoxy nanocomposite polymer, the epoxy resin composition made by the steps of: (a) mixing an epoxy resin with the filler composition of the instant invention to form an epoxy resin mixture; and (b) removing organic solvent from the epoxy resin mixture to form the epoxy resin composition. A cured epoxy nanocomposite polymer according to the instant invention can be made by mixing an epoxy resin curing agent with the above described epoxy resin composition to form an uncured epoxy nanocomposite polymer followed by curing the uncured epoxy nanocomposite polymer to form an epoxy nanocomposite polymer containing filler having an average size of at least one dimension of the filler of less than two hundred nanometers upon examination by transmission electron microscopy of a representative sample of the epoxy nanocomposite polymer.

The epoxy resin component used to prepare the epoxy resin composition of the instant invention is a polyepoxide. The polyepoxide compound useful in the practice of the present invention is suitably a compound which possesses one or more vicinal epoxy group per molecule, i.e. at least one 1,2-epoxy group per molecule.

In general, the polyepoxide compound is a saturated or unsaturated aliphatic, cycloaliphatic, aromatic or heterocyclic compound which possesses at least one 1,2-epoxy group. The polyepoxide compound can be substituted, if desired, with one or more non-interfering substituents, such as halogen atoms, hydroxy groups, ether radicals, lower alkyls and the like.

The polyepoxide compounds useful in the present invention are well known in the art. Illustrative polyepoxide compounds useful in the practice of the present invention are described in the *Handbook of Epoxy Resins* by H. E. Lee and K. Neville published in 1967 by McGraw-Hill, New York and U.S. Pat. No. 4,066,628, incorporated herein by reference.

Particularly useful polyepoxide compounds which can be used in the practice of the present invention are polyepoxides having the following general formula:

wherein R is substituted or unsubstituted aromatic, alphatic, cycloaliphatic or heterocyclic polyvalent group and n has an average value of from 1 to less than about 8.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyltetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl)propane (generally referred to as bisphenol A) and diglycidyl ether of 2,2-bis(3,5-dibromo-4-hydroxyphenyl)propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include for example, αω-diglycidyloxyisopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include the so-called "solid epoxy resins" prepared either by reaction of diglycidyl ethers of dihydric phenols with dihydric phenols or by reaction of dihydric phenols with epichlorohydrin (also known as "taffy resins").

Preferred epoxy resins useful in the present invention include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids mentioned previously.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

wherein R is as defined above and n is as defined above.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl)adipate, vinylcyclohexene monoxide and mixtures thereof.

In general, the epoxy resin has a number average molecular weight of less than 20,000, preferably less than 10,000, and more preferably less than 8,000. Generally, the epoxy resins useful in the present invention have an average molecular weight of from about 200 to about 20,000, preferably from about 200 to about 10,000, and more preferably from about 200 to about 8,000.

The epoxide equivalent weight of the epoxy resins is generally from about 100 to about 8000 and more preferably from about 100 to about 4000. As used herein the terms "epoxide equivalent weight" refers to the average molecular weight of the polyepoxide molecule divided by the average number of oxirane groups present in the molecule. The preferred diepoxides useful in the present invention are the epoxy resins having an epoxy equivalent weight of from about 100 to about 4000.

The most preferred epoxy resin used in the present invention are the glycidyl polyethers of 2,2-bis(4-hydroxyphenyl) propane having an average molecular weight between about 340 and about 900 and an epoxide equivalent weight of between about 170 and about 500. Especially preferred are the glycidyl polyethers of 2,2-bis(4-hydroxyphenyl) propane having an average molecular weight of between about 340 and about 900, an epoxide equivalent weight of between about 170 and about 500, and containing from about 0.01% to about 1.0% weight or higher of saponifiable chlorine.

In general, the epoxy resin is used in an amount of from about 1 wt. % to about 99 wt. %, more preferably, from about 5 wt. % to about 95 wt. % and, most preferably, from about 10 wt. % to about 90 wt. %, based on the weight of reactants.

In another embodiment, the instant invention is a nanocomposite polymer, made by the steps of: mixing the filler composition of the instant invention with one or more polymer, polymer component, monomer or prepolymer to produce a polymer containing a filler having an average size of at least one dimension of the filler of less than two hundred nanometers upon examination by transmission electron microscopy of a representative sample of the polymer. Although not limited thereto, the polymer can be selected from the group consisting of polyolefin polymers and copolymers, polyamide polymers and copolymers, polyester polymers and copolymers, polycarbonate polymers and copolymers, epoxy polymers and copolymers, styrenic polymers and copolymers, and mixtures thereof.

The epoxy resins of the present invention are useful, for example, in the preparation of coatings, inks, resists, adhesives, moldings, composites, laminates, castings, pottings, and encapsulants.

EXAMPLE 1

4 g of montmorillonite (called "Pristine MMT) having a cation exchange capacity of 92.6 meq/100 g (Cloisite Na Brand from Southern Clay Products, Gonzales, Tex.) is dispersed in 400 g of water with mixing overnight to produce a first dispersion. The dispersion is centrifuged for three hours at 4,400 gravity to form a gel-like product (called "g-MMT") which is mixed with 400 mL of acetone, sonicated for one hour and mixed overnight to produce a second dispersion. The second dispersion is centrifuged for three hours at 4,400 gravity to form a gel-like product which is mixed with 400 mL of acetone, sonicated for one hour and mixed overnight to produce a third dispersion. The third dispersion is centrifuged for three hours at 4,400 gravity to form a gel-like product (called "n-MMT") which is mixed with 400 mL of acetone, sonicated for one hour and mixed overnight to produce a filler composition of the instant invention.

EXAMPLE 2

The filler composition of Example 1 is sonication mixed with epoxy resin (DER 332 Brand diglycidyl ether of bisphenol epoxy resin from The Dow Chemical Company, Midland, Mich.) to form an epoxy resin mixture. Most of the acetone is removed from the epoxy resin mixture by vacuum distillation at 90° C. to produce an epoxy resin composition of the instant invention.

EXAMPLE 3

Figure 1A:
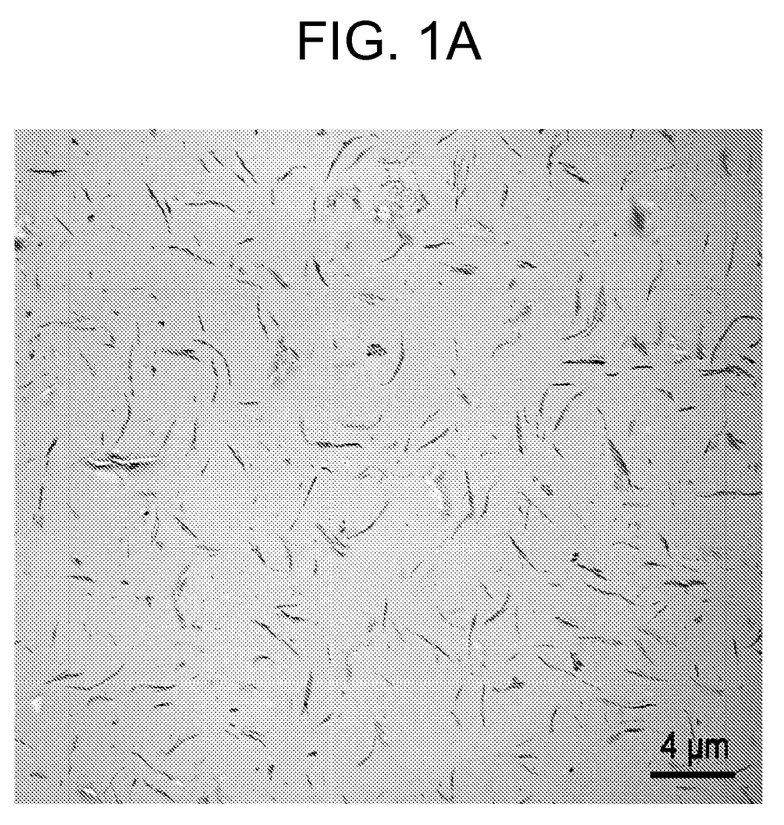
FIG. 1A is a transmission electron micrograph of an epoxy nanocomposite made using a composition of the instant invention.
Figure 1B:
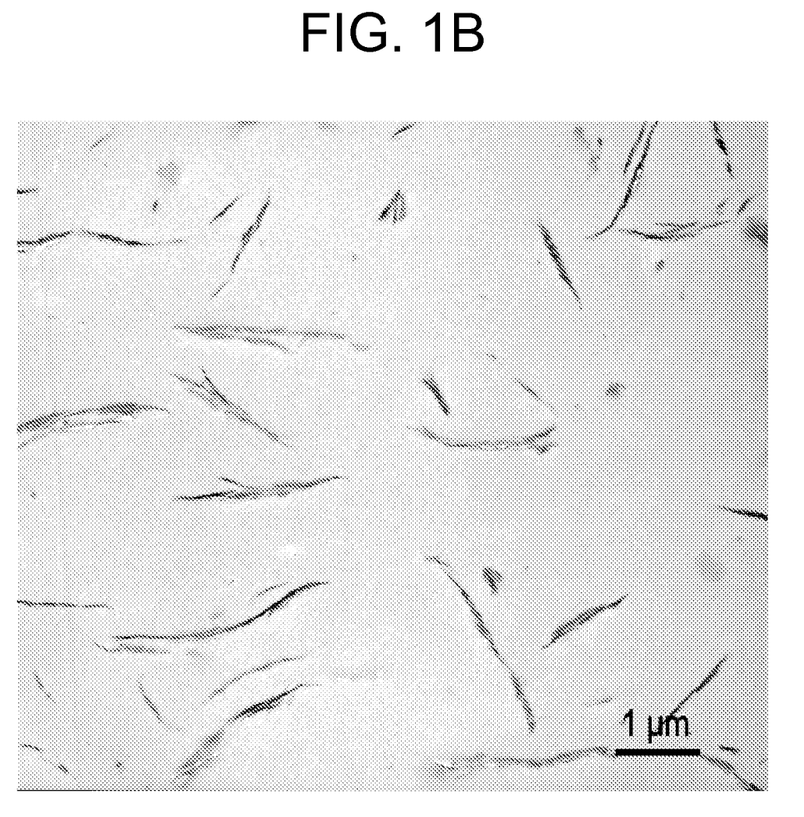
FIG. 1B is a transmission electron micrograph of the epoxy nanocomposite of FIG. 1A at higher magnification.

The epoxy resin composition of Example 2 is mixed with 4,4'-diamino-diphenyl sulfone (DDS) curing agent (Aldrich Chemical, Milwaukee, Wis.), poured into test bar molds and cured at 180° C. for 2 hours followed by a post cure at 220° C. for 2 hours to produce test bars of an epoxy nanocomposite of the instant invention (called "epoxy/n-MMT") containing 4.5% by weight of montmorillonite. FIGS. 1A and 1B show a representative transmission electron micrograph of the epoxy nanocomposite of this invention.

COMPARATIVE EXAMPLE 1

Epoxy resin (DER 332 Brand diglycidyl ether of bisphenol epoxy resin from The Dow Chemical Company, Midland, Mich.) is mixed with 4,4'-diamino-diphenyl sulfone curing agent (Aldrich Chemical, Milwaukee, Wis.), poured into test bar molds and cured at 180° C. for 2 hours followed by a post cure at 220° C. for 2 hours to produce test bars of an epoxy polymer (called "Neat epoxy") not containing any filler.

COMPARATIVE EXAMPLE 2

Figure 2:
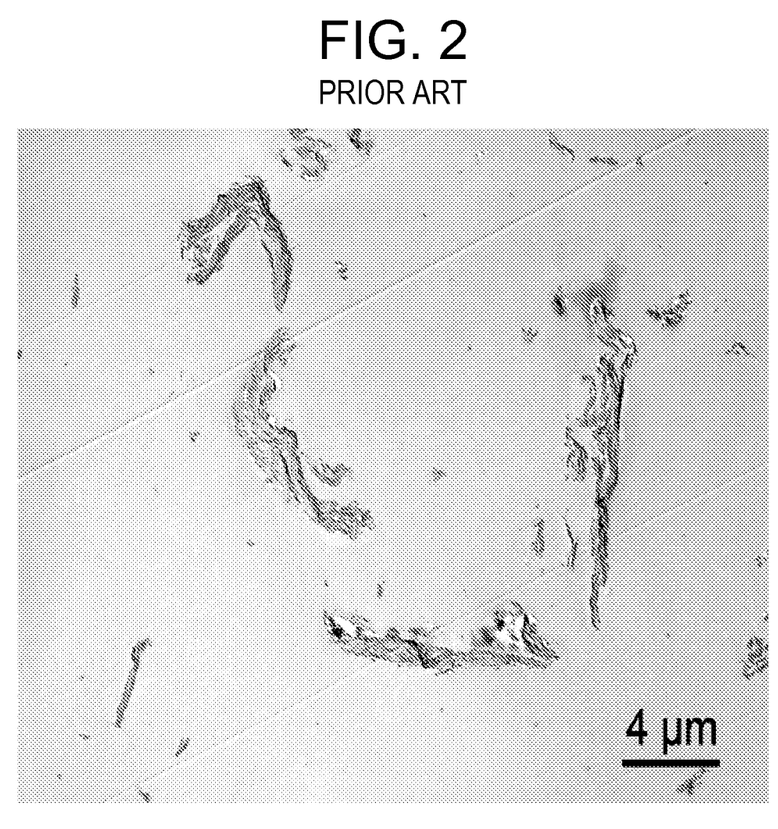
FIG. 2 is a transmission electron micrograph of a prior art epoxy nanocomposite.

4 g of montmorillonite having a cation exchange capacity of 92.6 meq/100 g (Cloisite Na Brand from Southern Clay Products, Gonzales, Tex.) is dispersed in 400 mL of acetone to form a dispersion of montmorillonite in acetone and then mixed with epoxy resin (DER 332 Brand diglycidyl ether of bisphenol epoxy resin from The Dow Chemical Company, Midland, Mich.) to form an epoxy resin mixture. Most of the acetone is removed from the epoxy resin mixture by vacuum distillation at 90° C. to produce an epoxy resin composition. The epoxy resin composition is mixed with 4,4'-diamino-diphenyl sulfone curing agent (Aldrich Chemical, Milwaukee, Wis.), poured into test bar molds and cured at 180° C. for 2 hours followed by a post cure at 220° C. for 2 hours to produce test bars of an epoxy nanocomposite (called "epoxy/d-MMT") containing 4.5% by weight of montmorillonite. FIG. 2 shows a representative transmission electron micrograph of the epoxy nanocomposite of this comparative example.

Testing

X-ray diffraction (XRD) patterns of the polymer samples are recorded using a Bruker D8 diffractometer with Bragg-Brentano θ-2 geometry (40 kV and 40 mA) and a graphite monochromator. When running XRD on the g-MMT sample and the n-MMT sample, the samples were covered with Mylar brand X-ray film (from Complex Industries, Inc. Palm City, Fla.) to minimize evaporation of water or acetone respectively from the samples.

Transmission electron microscopy (TEM) was performed on a JEOL JEM Brand 1200 EX microscope operated at 100 kV. A Reichert-Jung Ultracut-E Brand Microtome is used to prepare 70-100 nanometer thick section of the polymer samples at room temperature for TEM imaging.

Dynamic mechanical analysis (DMA) is conducted using an RSA-III Brand instrument (from TA Instruments) ranging from −120 to 250° C., at a fixed frequency of 1 Hz and with a temperature increment of 5° C. per step. A sinusoidal strain-amplitude of 0.05% was chosen for the analysis. The maximum point on the tan δ curve is taken as the glass transition temperature ($T_g$) of the sample.

Flexural moduli are measured following test method ASTM D790-96a using an Instron Brand Model 4411 mechanical testing machine at a crosshead speed of 0.127 cm/minute. Five tests are run for each polymer and the average value is reported.

The single-edge-notch 3-point-bending (DRN-3PB) fracture toughness is measured following test method ASTM D5045-96 using the linear elastic fracture mechanics (LEFM) approach using an Instron Brand Model 4411 mechanical testing machine at a crosshead speed of 0.127 cm/minute at room temperature. The test bars are notched with a jeweler saw, followed by tapping the crack tip with a liquid nitrogen chilled razor blade to wedge open a sharp crack. Care is exercised to make sure the starter crack exhibits a thumbnail shape crack front before testing. The ratio between the crack length and the specimen width is held between 0.4 and 0.6. Five tests are run for each polymer and the average value is reported.

The TEM analysis of freeze dried samples is one way to get at the size and degree of dispersion of the filler in a liquid comprising water. Rapid freezing is preferably employed to avoid crystalline ice formation that tends to disrupt the three dimensional network. A small droplet of the dispersion is withdrawn using a pipette, rod or other suitable device and placed on a suitable carrier to include a TEM grid, a small SEM sample stub or a copper top hat sandwich. The carrier composition should have good thermal conduction characteristics and its mass should be kept to a minimum to optimize freezing rates. Quickly freeze the sample by rapidly immersing it into an appropriate cryogen like liquid propane, nitrogen slush or spray the top hat sandwich with a pressurized cryogen to obtain freezing rates of approximately 10,000° C./sec. The sample is transferred in liquid nitrogen to a cryotransfer stage for the SEM or TEM or to a freeze drier. For the sample transfer stage method one may either examine the sample in the frozen hydrated state with the use of matrix sublimation to enhance contrast or expose detail or one may freeze dry the sample in the microscope vacuum or suitable vacuum chamber. Images are preferably recorded in two or three dimensions for the purpose of determining the shape and measuring the dimensions of the filler. Charge compensation methods are preferably used, typically including operating at low accelerating voltages, the application of a thin conductive metal coating or a low vacuum mode of operation or a combination of the above, to reduce sample charging in the SEM operation.

Experimental Discussion

The following Table 1 lists the Glass Transition Temperature and Storage Moduli data for the polymers tested.

TABLE 1

| | | (Comparative Example 1) Neat epoxy | (Comparative Example 2) epoxy/d-MMT | (Example 3) epoxy n-MMT |
|---|---|---|---|---|
| $T_g$ (° C.) | | 228 | 225 | 228 |
| Storage modulus (Pa) | at 25° C. | 2.50 × 10⁹ | 2.85 × 10⁹ | 2.97 × 10⁹ |
| | at 120° C. | 1.80 × 10⁹ | 2.06 × 10⁹ | 2.31 × 10⁹ |
| | at 250° C. | 6.35 × 10⁷ | 6.25 × 10⁷ | 9.82 × 10⁷ |

The following Table 2 lists the Fracture Toughness and Flexural Modulus for the polymers tested.

TABLE 2

| | (Comparative Example 1) Neat epoxy | (Comparative Example 2) Epoxy/d-MMT | (Example 3) Epoxy/n-MMT |
|---|---|---|---|
| $K_{IC}$ (MPa · m$^{1/2}$) | 0.70 ± 0.03 | 0.97 ± 0.01 | 0.79 ± 0.02 |
| Flexural Modulus (GPa) | 2.67 ± 0.05 | 3.07 ± 0.13 | 3.62 ± 0.19 |

Figure 3:
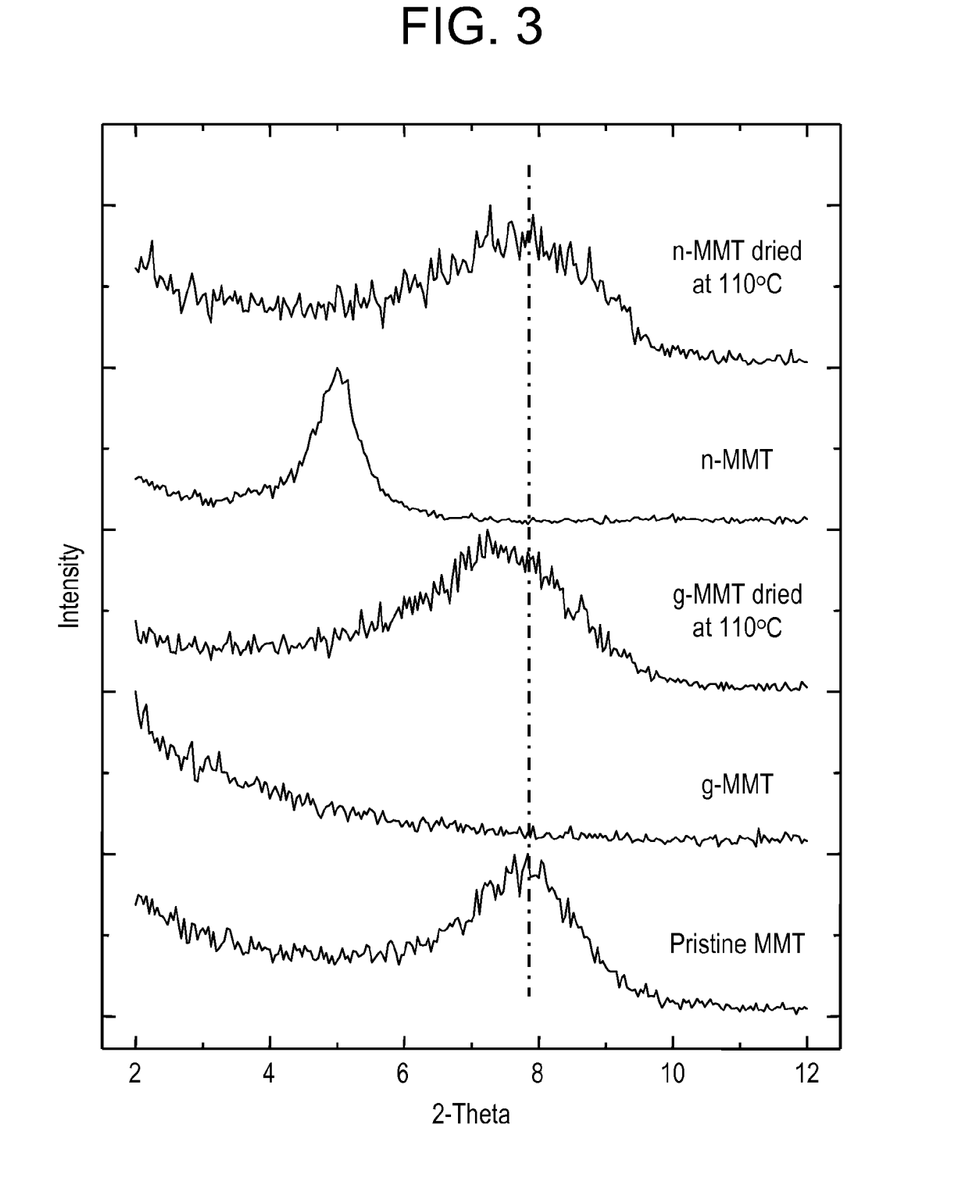
FIG. 3 shows the X-ray diffraction patterns of n-MMT dried at 110° C., for n-MMT, for g-MMT dried at 110° C., for g-MMT and for Pristine MMT.
Figure 4:
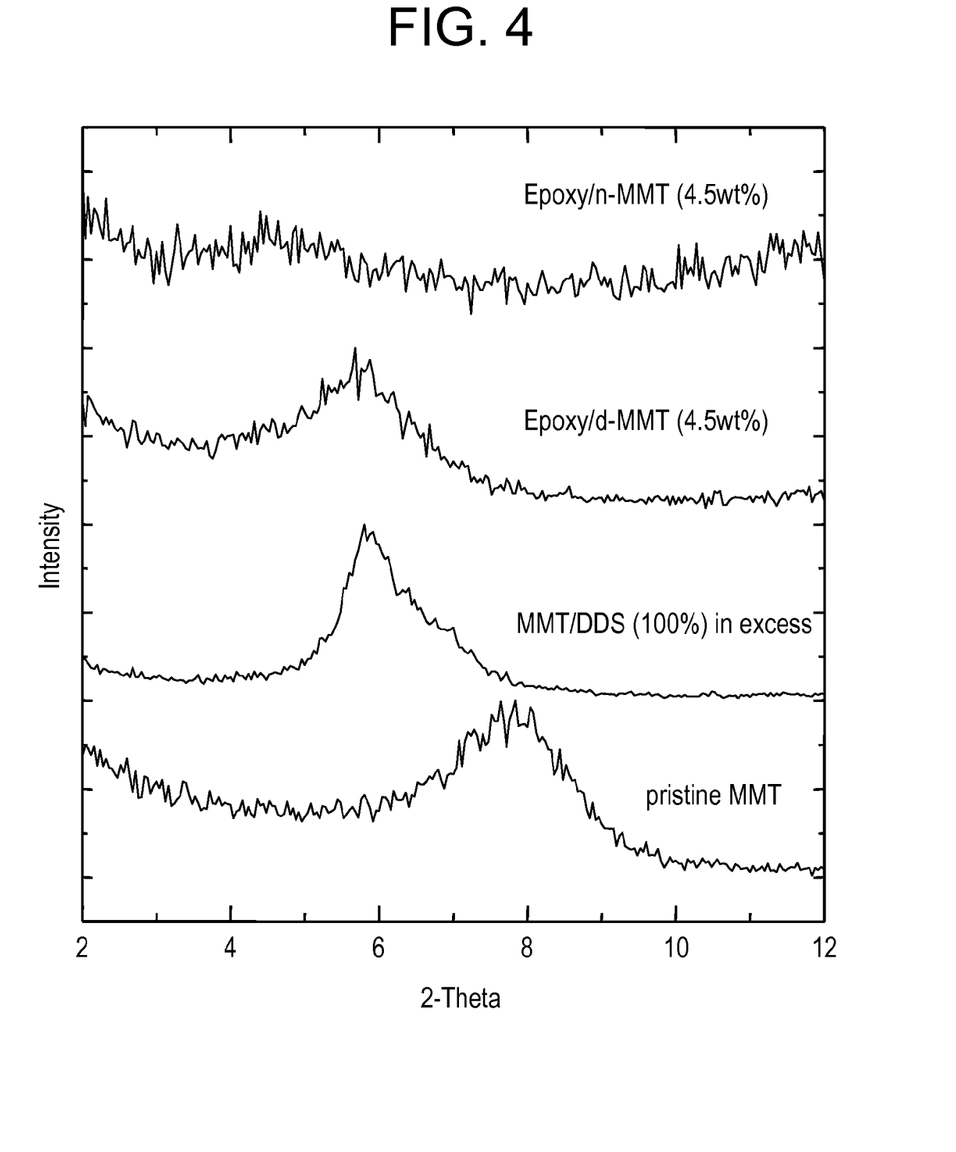
FIG. 4 shows the X-ray diffraction patterns of Epoxy/n-MMT, for Epoxy/d-MMT, for MMT mixed with epoxy curing agent DDS and for Pristine MMT.
Figure 5:
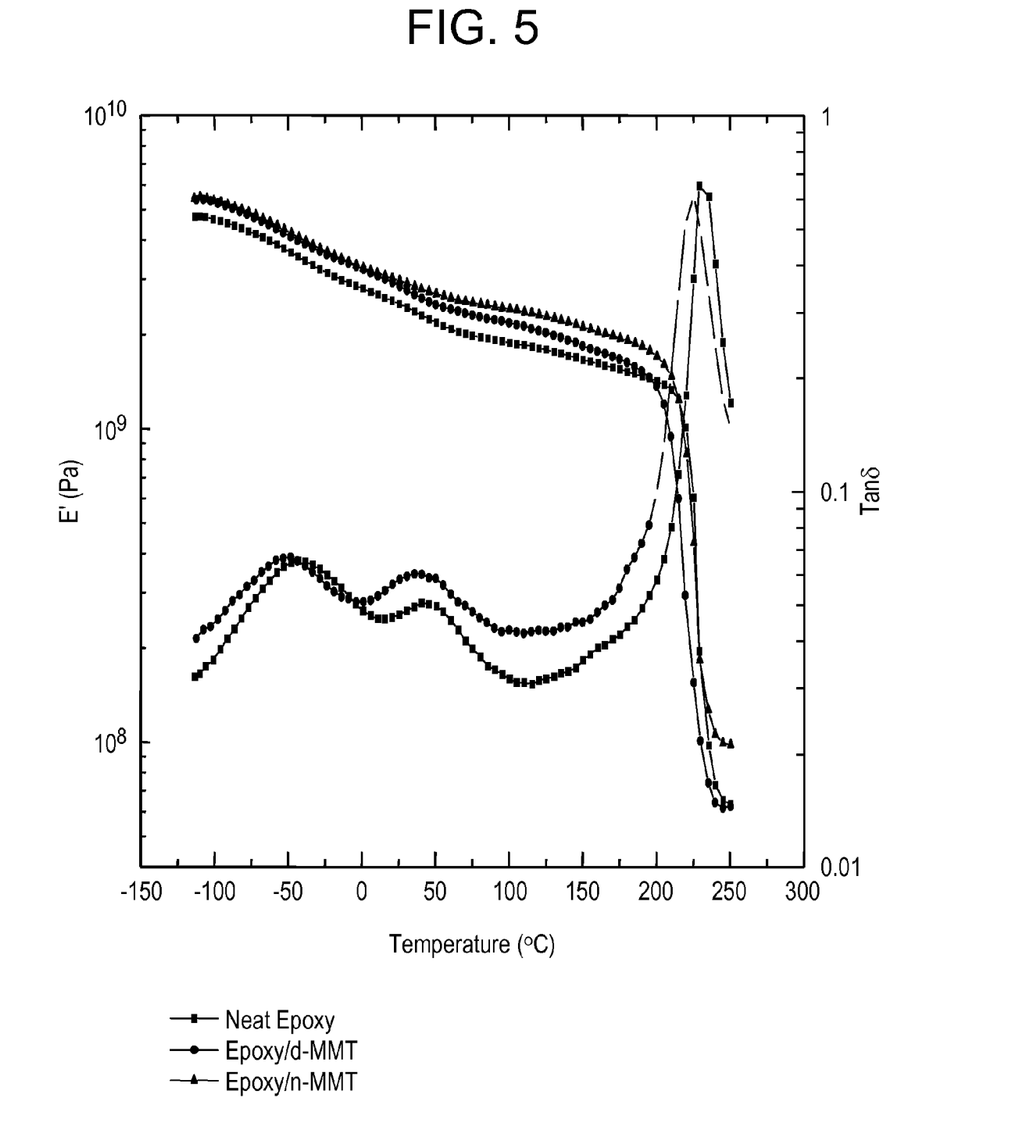
FIG. 5 shows the dynamic-mechanical analysis scans for Neat epoxy, for Epoxy/d-MMT and for Epoxy/n-MMT.

FIG. 3 shows the XRD patterns of n-MMT dried at 110° C., for n-MMT, for g-MMT dried at 110° C., for g-MMT and for Pristine MMT. FIG. 4 shows the XRD patterns of Epoxy/n-MMT, for Epoxy/d-MMT, for MMT mixed with epoxy curing agent DDS and for Pristine MMT. FIG. 5 shows the DMA scans for Neat epoxy, for Epoxy/d-MMT and for Epoxy/n-MMT.

Referring now to FIG. 3, the pristine MMT clay has a inter-gallery spacing peak at about 2θ=7.8°, which corresponds to an interlayer distance of 11.3 Å. When the exfoliated clay nanoplatelets in water are collected by centrifugation, there is still some water present in the g-MMT. The XRD pattern observed immediately after centrifugation is principally of amorphous characteristic, suggesting that the layered structure has exfoliated into XRD undetectable individual nanoplatelets. The sample of n-MMT in acetone shows a relatively sharp peak at 5.0° (17.7 Å) in XRD pattern. This indicates that during the solvent exchange and centrifugation-redispersion steps, a large amount of acetone molecules are trapped inside the collapsed clay gallery, which leads to a relatively large interlayer spacing. After such an exchange process, it is expected that most of the water molecules have been removed from n-MMT. However, it is still anticipated that there may be a trace amount of remnant water trapped inside the MMT clay galleries. In order to confirm this fact, both g-MMT and n-MMT are dried at 110° C. for 24 hours. The XRD pattern of dried g-MMT shows a broad peak at a position of 2θ=7.6° (11.9 Å), which has a slightly larger d-spacing than that of the pristine MMT clay probably because most of the water molecules have escaped during the drying process. Only a very small amount of gallery water molecules still stay within the layers, thus resulting in a slightly larger interlayer distance compared with the pristine MMT clay. After the n-MMT is dried at 110° C. for 24 hours, the XRD pattern shows a broad peak. However, the peak is located at about 2θ=7.8° (11.3 Å), which is almost the same as that of the pristine MMT clay. By comparing against the XRD of dried g-MMT, most water molecules in n-MMT have been removed after three additional centrifugation-redispersion steps. However, there appears to remain a trace amount of water in n-MMT, which is evidenced by the broadening of the XRD peak, in comparison with the pristine clay peak. This trace amount of water in n-MMT may still give rise to difficulties for the subsequent intercalation and exfoliation of clay in oganophilic monomers or polymers. More centrifugation-redispersion cycles may be needed in critical applications to further remove water in n-MMT if more optimum exfoliation of clay in the nanocomposite polymer is to be accomplished. The above XRD analyses suggest that g-MMT is in a nearly exfoliated state based on XRD and n-MMT is well-intercalated by acetone before the incorporation of epoxy resin. As will be shown later, this state of intercalation is apparently beneficial in the preparation of epoxy/clay nanocomposites.

It should be noted that if the exfoliated MMT nanoplatlets in aqueous dispersion are to be exchanged into a water-miscible organic solvent that has a boiling point much higher than that of water, then the organic solvent can be directly mixed with the exfoliated MMT clay nanoplatelets in water. Afterwards, the water can be removed by heating the mixture at a temperature above 100° C. to obtain exfoliated MMT clay nanoplatelets in the organic solvent. In this case, no centrifugation-redispersion step is needed for the preparation of n-MMT.

As described earlier, n-MMT is mainly wetted by acetone, although a very small amount of water still apparently remains. After n-MMT is mixed with epoxy resin, it can be homogenously dispersed in epoxy with the help of mechanical stirring and sonication because epoxy monomer is miscible with acetone. Even after the acetone is removed, the clay nanoplatelets can still be uniformly dispersed in epoxy and no visible phase separation is detected. It is noted that if the n-MMT is obtained in less than 3 repeated centrifugation-redispersion cycles, then the epoxy/n-MMT will phase separate after acetone is removed. This finding suggests that in order to prepare well-dispersed epoxy polymer nanocomposites using the above approach, it is preferable to remove as much water from n-MMT as possible.

Referring now to FIGS. 1, 2 and 4, the morphological features of epoxy/clay systems are characterized by XRD and TEM. The XRD data in FIG. 4 show that after the d-MMT is mixed with epoxy resin and then cured with DDS, the MMT clay peak is shifted to 2θ-5.8°, corresponding to an MMT clay interlayer d-spacing of 15.2 Å. This increased interlayer distance from 11.3 to 15.2 Å is believed to be mainly caused by the intercalation of DDS in d-MMT. This conjecture is supported by the XRD pattern of MMT clay intercalated by DDS in acetone. This intercalated compound shows a peak at almost the same 2θ position as that of epoxy/d-MMT. In the case of the epoxy/n-MMT system, only a broad and weak hump at about 2θ=4.5° is shown. This observation of weak diffraction supports the belief that n-MMT can be intercalated and exfoliated by epoxy resin because of the presence of acetone inside the interlayer galleries. Due to the presence of a trace amount of water trapped inside the interlayers, some MMT clay particles may still stay loosely intercalated, which results in the observed broad and small hump at around 4° of the XRD pattern.

Referring now to FIGS. 1A and 1B, most MMT clay nanoplatelets are aggregated and form nano-tactoids, with dimensions of about 20 nm in thickness and about 1000 nm in length. Although the high aspect ratio n-MMT is not completely exfoliated to individual nanoplatelets, they are randomly dispersed throughout the epoxy matrix. The incomplete exfoliation may be caused by the presence of a trace amount of water inside the n-MMT galleries which prevents the complete insertion of acetone and epoxy monomers. Referring now to FIG. 2, it will be noted that the MMT clay nanoplatlets are even more highly aggregated than shown in FIGS. 1A and 1B.

Referring now to FIG. 5, there are no significant differences in the rubbery plateau moduli between neat epoxy and epoxy/d-MMT. However, in the case of epoxy/n-MMT, the rubbery plateau modulus is about 60% higher than those of neat epoxy and epoxy/d-MMT. This increase in rubbery plateau modulus is due to the presence of the relatively well-dispersed n-MMT nanotactoids in the epoxy nanocomposite of the instant invention.

A careful comparison of the storage moduli at various temperatures, as shown in Table 1 and FIG. 5 (upper curves), shows there are little or no differences in storage moduli between epoxy/d-MMT and epoxy/n-MMT systems at low temperatures. However, as the temperature increases, the storage modulus curve of epoxy/n-MMT begins to diverge from those of neat epoxy and epoxy/d-MMT. The differences become greater and greater, and reach a maximum when the temperature rises above $T_g$. The above phenomena have been consistently observed in various exfoliated polymer nanocomposites.

When organic cation modified MMT is used to prepare epoxy nanocomposites, a significant decrease in $T_g$ of epoxy nanocomposites have been observed in the prior art. This drop in $T_g$ is attributed in part to the unwanted reactions between the mono-functional amine organic modifiers and epoxy monomers, which lead to the formation of numerous dangling chain ends in the cured epoxy network. In this study, as shown in FIG. 5 and Table I, the $T_g$ values of the three epoxy systems are practically the same. Also, the Tan δ peak shapes around $T_g$ among the three epoxy systems are about the same, which signifies that the network characteristics among the three systems are about the same. It is noted that the retention of high $T_g$ in epoxy/clay nanocomposite is a significant advantage of the nanocomposite polymers of the instant invention for structural and functional applications. Referring now to Table 2, the flexural modulus for Epoxy/d-MMT is increased by only 15%. However, the flexural modulus for Epoxy/n-MMT is increased 35% at room temperature. This increase is significant and is attributed to the higher degree of exfoliation and dispersion of the MMT in Epoxy/n-MMT relative to Epoxy/d-MMT even though the MMT is not fully exfoliated in Epoxy/n-MMT. The Mode-I critical stress intensity factor values for Epoxy/d-MMT show the $K_{IC}$ value is increased by 39%. However, for the Epoxy/n-MMT system, the fracture toughness is slightly higher than that of the neat epoxy. In the case of Epoxy/n-MMT, if all the n-MMT nanoplatelets were to be fully exfoliated, the $K_{IC}$ values would be expected to be the same as that of the neat epoxy. The presence of nanotactoids in Epoxy/n-MMT can trigger limited crack deflection by delamination. Thus, the small increases in $K_{IC}$ values for Epoxy/n-MMT are expected.

Of particular significance, this disclosure demonstrates that it is possible to significantly enhance the modulus of polymers by using the intercalating agent-free approach presented herein. Since this new approach does not utilize any expensive, and sometimes toxic, organophilic surface modifiers, it is expected that physical properties, such as $T_g$ and thermal stability, of the polymer nanocomposite can be retained. Most importantly, the manufacturing cost of preparing polymer nanocomposites may be greatly reduced and become attractive for large-scale consumer products applications.

Conclusion

In conclusion, it should be readily apparent that although the invention has been described above in relation with its preferred embodiments, it should be understood that the instant invention is not limited thereby but is intended to cover all alternatives, modifications and equivalents that are included within the scope of the invention as defined by the following claims.

What is claimed is:

1. A filler composition formed by:
   (1) dispersing a water dispersible filler material in a liquid comprising water; and
   (2) replacing most of the water of the liquid with an organic solvent so that the water concentration of the liquid is less than six percent by weight to form the filler composition, the average size of at least one dimension of the filler material being less than two hundred nanometers upon examination by transmission electron microscopy of a representative freeze dried sample of the dispersion of (1);

wherein the filler composition is formed without adding an intercalation agent to the water dispersible filler material, and the water dispersible filler material is a cation exchanging layered material having a cation exchanging capacity that is less than twenty percent exchanged with an organic cation.

2. The filler composition of claim 1, wherein the cation exchanging layered material is selected from the group consisting of natural or synthetic bentonite, montmorillonite, hectorite, fluorohectorite, saponite, stevensite, nontronite, sauconite, glauconite, vermiculite, chlorite, mica, hydromica, muscovite, biotite, phlogopite, illite, talc, pyrophillite, sepiolite, attapulgite, palygorskite, berthierine, serpentine, kaolinite, dickite, nacrite, halloysite, allophane, immogolite, hydrotalcite, pyroaurite, calcite, wollastonite and mixtures thereof.

3. The filler composition of claim 1, wherein the water concentration of the liquid is less than three percent by weight.

4. The filler composition of claim 1, wherein the water concentration of the liquid is less than one percent by weight.

5. The filler composition of claim 1, wherein the water concentration of the liquid is less than one half percent by weight.

6. The filler composition of claim 1, wherein the water concentration of the liquid is less than one tenth percent by weight.

7. A nanocomposite polymer, made by the steps of:
providing the filler composition of claim 1; and
mixing the filler composition with one or more polymer, polymer component, monomer or prepolymer to produce the nanocomposite polymer containing the filler composition.

8. The nanocomposite polymer of claim 7, wherein the polymer is selected from the group consisting of polymers and copolymers of, polyolefins, polyamids, polyesters, polycarbonates, epoxies, styrenic polymers, polyurethanes, poly(alkyl)acrylates, polyacetals, polysulfides, polysulfones, polyethers, polyarylethers, polyketones, polyarylketones, polyimides, poly(vinyl halide)s, poly(vinylidene halide)s, poly(tetrafluoroethylene), polysiloxanes, cyanate polymers, maleimide polymers, vinylester resin polymers and mixtures thereof.

9. The nanocomposite polymer of claim 7, wherein the monomer comprises an epoxy resin and wherein the filler composition is mixed with the epoxy resin to form an epoxy resin mixture, where the epoxy resin mixture is devolatilized to remove organic solvent.

10. The nanocomposite polymer of claim 9, further including an epoxy resin curing agent mixed with the epoxy resin mixture to produce a cured epoxy nanocomposite polymer containing filler having an average size of at least one dimension of the filler of less than two hundred nanometers upon examination by transmission electron microscopy of a representative sample of the cured epoxy nanocomposite polymer.

11. An epoxy nanocomposite coating made by the steps of:
(a) providing the filler composition of claim 1:
(b) mixing an epoxy resin with the filler composition;
(c) mixing a curing agent and optionally a catalyst, accelerator, and processing additives with the epoxy resin and the filler composition to form a mixture;
(d) applying the mixture to a substrate; and
(e) allowing the organic solvent in the mixture to evaporate and the mixture to cure.

12. The epoxy nanocomposite coating of claim 11, including exchanging and/or adding organic solvents after steps (b) or (c).

* * * * *